S. P. BROWER & W. H. KNOX.
Lath-Machines.
No. 143,325.                              Patented September 30, 1873.
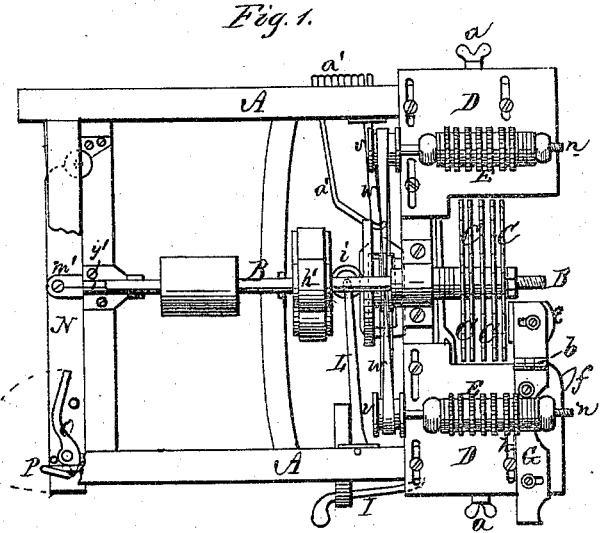
Fig. 1.
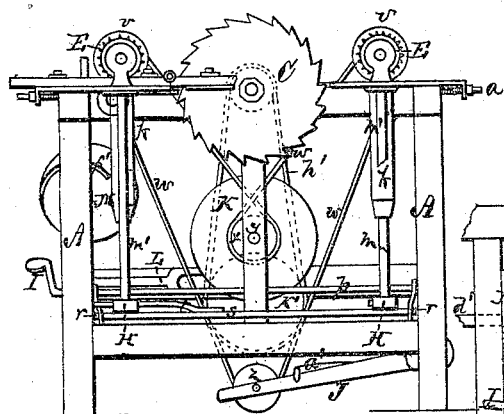
Fig. 2.
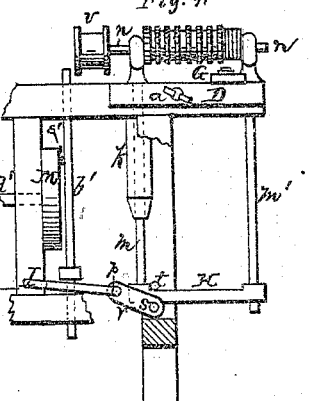
Fig. 3.
Fig. 4.
Witnesses:
Henry N. Miller
C. L. Evert
Inventor.
Samuel P. Brower
Wm. H. Knox
per
Alexander Mason
Attorneys.

UNITED STATES PATENT OFFICE.

SAMUEL P. BROWER AND WILLIAM H. KNOX, OF GLEN'S FALLS, NEW YORK.

IMPROVEMENT IN LATH-MACHINES.

Specification forming part of Letters Patent No. 143,325, dated September 30, 1873; application filed May 24, 1873.

*To all whom it may concern:*

Be it known that we, SAMUEL P. BROWER and WILLIAM H. KNOX, of Glen's Falls, in the county of Warren and in the State of New York, have invented certain new and useful Improvements in Lath-Machine; and do hereby declare that the following is a full, clear, and exact description thereof, reference being had to the accompanying drawings and to the letters of reference marked thereon making a part of this specification.

The nature of our invention consists in the construction and arrangement of a machine for cutting laths, as will be hereinafter more fully set forth.

In order to enable others skilled in the art to which our invention appertains to make and use the same, we will now proceed to describe its construction and operation, referring to the annexed drawing, in which—

Figure 1 is a plan view, and Fig. 2 an end elevation, of our machine. Fig. 3 is a plan view of a part of the machine-table, and Fig. 4 is a side elevation of a part of the machine, showing the construction and mode of operation of the feed-rollers.

A represents the frame of our machine constructed in any suitable substantial manner to contain the working-parts of the same. B represents the saw-arbor placed in suitable bearings lengthwise in the middle of the upper part of the frame A, and carries at its front or outer end the saws C C. On each side of the saws—that is, in front and rear—is an adjustable table, D, carrying a feed-roller, E. These tables D D may be adjusted to or from the saw-arbor by means of set-screws $a\ a$, or any other suitable means for the purpose of using saws of different diameters—say, varying from six to twenty-four inches on the same machine. On the table D, in front of the saws C C, is placed a gage, G, which may be adjusted to or from the saws, as required, and is made in two pieces jointed or hinged together at $b$, so that the outer end may be tipped up for the purpose of removing the saws for sharpening. On the under side of the outer hinged part of the adjustable gage G is attached an adjustable plate, $e$, which extends inwardly from the gage close to the outer saw, and forms a rest for the first piece of lumber next to the gage. In sawing narrow strips they are very apt to spring off from the gage and thereby spoil the lumber. To obviate this difficulty we pivot a lever, $f$, on the under side of the front feed-table D, and at the inner end of this lever is pivoted a wheel or roller, $h$, which projects slightly through a slot in the table for the purpose of guiding the lumber. The operator can readily vary the angle of this roller at will, so as to give it more or less draft against the gage to suit circumstances, and thereby give the lumber just as much or little bearing against the gage as is desirable. On the under side of each table D is attached a tube, $k$, through which passes a vertical rod, $m$. The upper end of this rod above the table is formed into a head to make a bearing for a horizontal shaft, $n$, upon which the feed-roller E is secured, the other end of said shaft having its bearing in a similar head formed on the upper end of another rod, $m'$, which also passes vertically through the table D. The lower end of the rod $m'$ is secured in the outer end of an arm, H, which is firmly attached to and extends from the rod $m$. The rods $m\ m'$, arm H, and shaft $n$ thus form a frame supporting the feed-roller, and which may be elevated or depressed, as may be required. $p$ represents a shaft with a crank, I, on its front end, and on said shaft are secured two arms, $r\ r$, which support, in their outer ends, a rod, $s$. This rod passes under the two arms H H, near their inner ends, and has an arm, $t$, passing on top of that arm H which belongs to the frame in the front feed-table. Upon the inner end of each shaft $n$ is a pulley, $v$, over which passes an endless belt, $w$. This belt passes around a pulley, $x$, on a horizontal shaft, $y$, over the pulleys $v\ v$, and under a pulley, $z$, in a frame, J, as shown fully in Fig. 2. The frame J is hinged or pivoted in the main frame A, and held downward by means of a spring, $a'$, thereby keeping the belt $w$ taut at all times; and, at the same time, it will allow of the frames carrying the feed-rollers E E to be raised at will, and give to the lumber passing between them and the tables D D. It will be seen that, by depressing the crank or lever I, both feed-rollers are raised at one time, but the front roller may go down without the rear roller, so that the rear roller will hold and move the lumber after it has passed from under the front roller. The feed-rollers E E are revolved by the endless belt $w$, from the pulley $x$ on the shaft $y$, and on this shaft is a circular disk or wheel, K. Below the shaft $y$ is another shaft, $y'$, which extends toward the other end of the frame A, and has upon its inner end a circular disk or wheel, $K'$. The two shafts $y$ $y'$ are so arranged that the circumference of the wheel $K'$ will be immediately below the shaft $y$. Between the two wheels K and $K'$, and touching both, is a rubber or leather covered roller, $i$, mounted in a forked arm, L, which is attached to an upright shaft, $b'$. On this shaft is a pin, $e'$, which enters a cam-shaped groove, $f'$, in a disk, M, mounted on the end of a horizontal shaft, $d'$. By turning the disk M the roller $i$ is raised or lowered at will, so that the speed of the feed-rollers can be easily regulated, the shaft $y'$ being revolved by a belt, $h'$, from a pulley on the main shaft B and around the wheel $K'$, and the roller $i$ communicating the motion from said wheel $K'$ to the wheel K, and then, by the belt $w$, to the feed-rollers. The outer end of the shaft $y'$ is held in a box, $m'$, pivoted on a pivoted bar or lever, N. On the outer end of this bar is a cam-shaped lever, O, which may be turned so as to throw this end of the bar N outwardly, thereby drawing the wheel $K'$ away from the roller $i$ and stopping the feed. When the cam-lever O is turned back again a spring, P, throws the bar N inward again, thereby bringing the wheel $K'$ in contact with the roller $i$ and starting the feed.

Having thus fully described our invention, what we claim as new, and desire to secure by Letters Patent, is—

1. The combination, with the saw-arbor and removable saws, of the slotted and adjustable tables D D, rods $m$ $m$ $m'$ $m'$ passed through the tables, the shafts $n$ $n$, and feed-rollers E E, all constructed and operated substantially as and for the purposes set forth.

2. The combination of the adjustable gage G, having its outer end hinged or jointed, and the adjustable plate $e$ attached to the under side of the outer end of the gage, all constructed substantially as and for the purposes set forth.

3. The pivoted lever $f$ with wheel $h$, operating through a slot in the front table D, substantially as and for the purposes herein set forth.

4. The combination of the shaft $p$ with crank I and arms $r$ $r$, and the rod $s$ with arm $t$, for raising and lowering the feed-roller frames, substantially as and for the purposes herein set forth.

In testimony that we claim the foregoing we have hereunto set our hands this 14th day of April, 1873.

SAMUEL P. BROWER.
WM. H. KNOX.

Witnesses:
THOMAS POTTER,
I. L. DIX.